March 15, 1949. T. A. SALA 2,464,614
METHOD OF IMPARTING SMOKY FLAVORS TO SOFT FOODS
Filed Sept. 17, 1947
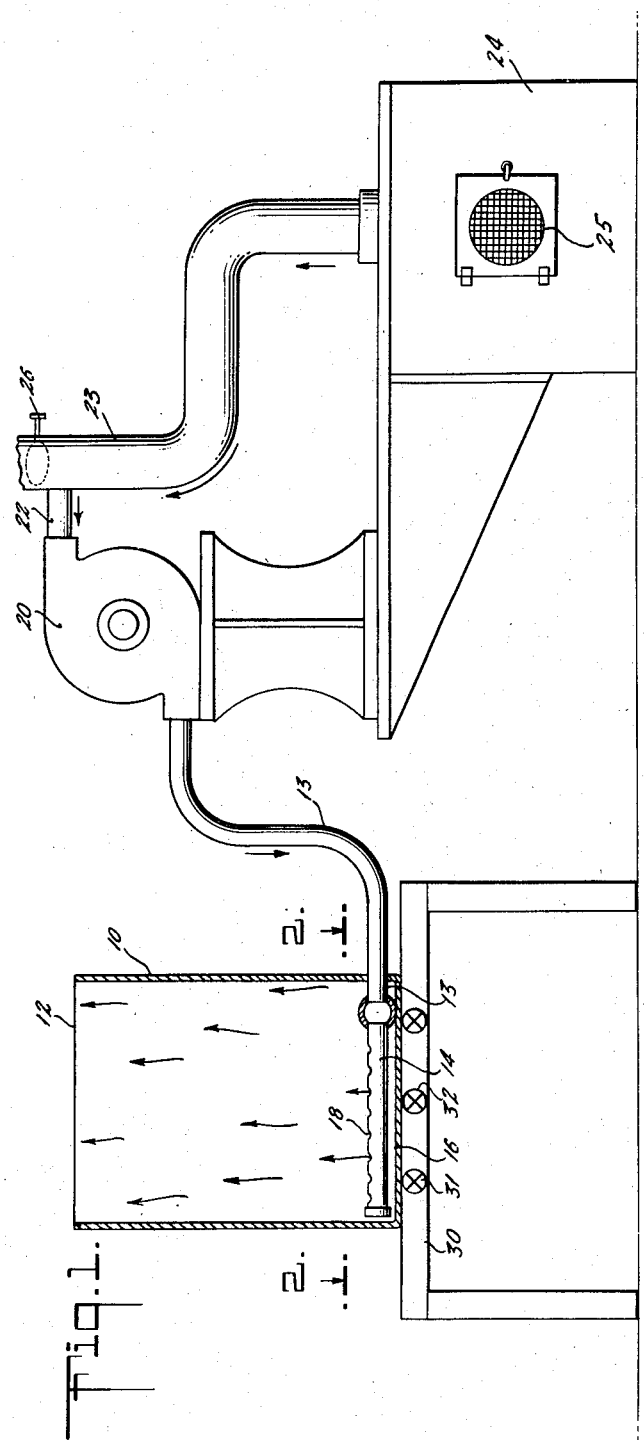
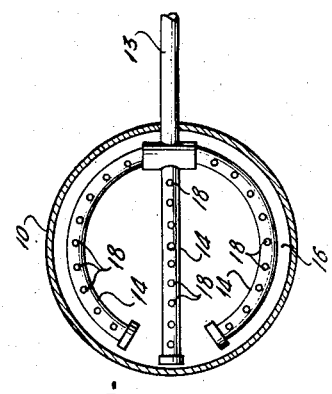
INVENTOR
THEODORE ASBURY SALA
BY
Schaines + Lieberman
ATTORNEYS Patented Mar. 15, 1949

2,464,614

UNITED STATES PATENT OFFICE 2,464,614

METHOD OF IMPARTING SMOKY FLAVORS TO SOFT FOODS

Theodore Asbury Sala, Dallas, Tex.

Application September 17, 1947, Serial No. 774,502

1 Claim. (Cl. 99—229)

My invention relates generally to food treatment, and in particular it relates to a method of and apparatus for imparting a smoky flavor to foods. More specifically, my invention relates to the treatment of liquid or semi-liquid foods, as will be referred to by the expression "soft foods" these including solid foods in small particle form mixed with liquids. The present invention is well adapted for the treatment of soft foods as stews, soups, sauces, chili, catsup or ketchup, or other liquid foods.

The main object of my invention is the provision of a new and improved method for imparting the highly desirable wood smoke flavor to soft foods, and a new and improved apparatus therefor.

Another object of my invention is the method of treating soft foods by subjecting same simultaneously to heat and smoke, the latter under sufficient pressure as to agitate the foods during the heating thereof.

Still another object of the present invention is the provision of a method for treating partially cooked soft foods which comprises heating same to completion while agitating same by smoke under pressure and imparting to the foods the highly desirable smoke flavor of the agitating medium.

Still another object of my invention is the provision of an apparatus for treating soft foods which consists of an imperforate container for the foods open at the top thereof, means for heating the container, a smoke forming unit, means for introducing the smoke under the pressure into the container at the bottom thereof and through the foods.

Other and further objects of my invention will be obvious from the following description of an illustrative embodiment thereof, and still others will be specifically recited hereinafter.

In the drawings annexed hereto, forming a part hereof,

Figure 1 is a side elevational view of one form of device constructed according to and embodying my invention, the food container component thereof being shown in section; and Fig. 2 is a horizontal section on the line 2—2 of Fig. 1.

The food container component of my apparatus is designated generally by reference numeral 10, and comprises an imperforate container of metal or the like. I have illustrated the container as a hollow cylindrical body open at the top 12 thereof, but any other suitable shape of container may be employed, the desiderata being substantial depth and heat transmissal.

A pipe or tube 13 is led into the interior of container 10, near the bottom 16 thereof, tube 13 having a plurality of branches 14, 14 spaced apart from each other over the cross-sectional area of the container. Apertures as 18, 18 are provided in each of branches 14, 14 opening upwardly of the container, the reasons for which will be developed below. The other end of pipe or tube 13 is connected to a blower or pressure unit 20, which in turn, via pipe 22 is in communication with a smoke carrier line 23 leading from a wood burning, smoke-producing unit 24.

Container 10 may be mounted on a table or other support 30 having suitable heating units 32 therein or thereon.

In operation, container 10 may be charged with the foods to be treated, stew for example, comprising meat particles, vegetables, sauces, etc., the whole comprising a semi-solid mass. Wood is introduced into unit 24 through opening 25 and ignited. Damper 26 is closed so as to form smoke, or aid in the formation of the smoke. Heating units 32, 32 may be suitably energized to simmer the food contents, and blower or pressure unit 20 turned on to force the smoke through conduit pipe 13, through branches 14, 14 and out of openings 18, 18 upwardly through the food mass, along the lines of the arrows, as in Figure 1. The pressure must be sufficient to agitate the mass thoroughly, and will vary with the food being treated. Sauces will require less pressure, while stews and chili will require greater pressure to cause thorough agitating and smoke impregnation.

The smoke effects a double purpose. Not only does it flavor the food, but also it agitates same during the final heat treatment thereof, and the resultant product will be of uniform quality and flavor.

My blower or pressure unit 20 may be operated by any suitable means, electrical, mechanical or otherwise, and the device as a whole is extremely simple, both in construction and operation.

Having now described my invention, what I claim and desire to secure by Letters Patent is:

The method of treating soft foods to impart thereto a wood smoke flavor, which method comprises forcing wood smoke under sufficient pressure through the mass of soft foods upwards from the bottom of the mass at a plurality of points, as to agitate the mass and thoroughly permeate the same with the flavoring wood smoke.

THEODORE ASBURY SALA.

(References on following page)

REFERENCES CITED

The following references are of record in the file of this patent:

UNITED STATES PATENTS

| Number | Name | Date |
|---|---|---|
| 1,009,953 | Boyle | Nov. 28, 1911 |
| 1,290,421 | Ullin | Jan. 7, 1919 |
| 1,631,463 | Britt | June 7, 1927 |
| 1,981,225 | Freshel | Nov. 20, 1934 |
| 2,266,131 | Thon | Dec. 16, 1941 |
| 2,333,505 | Allen | Nov. 2, 1943 |
| 2,389,488 | Dailey | Nov. 20, 1945 |